(12) United States Patent  
Bearley et al.

(10) Patent No.: US 11,394,735 B2  
(45) Date of Patent: **\*Jul. 19, 2022**

(54) DYNAMIC RECORD IDENTIFICATION AND ANALYSIS COMPUTER SYSTEM WITH EVENT MONITORING COMPONENTS

(71) Applicant: Bank of America Corporation, Charlotte, NC (US)

(72) Inventors: Amijo Bearley, Oxford, PA (US); Robert D. Jones, Wilmington, DE (US); Kolt Bell, Charlotte, NC (US); Craig Widmann, Chandler, AZ (US)

(73) Assignee: Bank of America Corporation, Charlotte, NC (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/929,150

(22) Filed: Jul. 15, 2020

(65) Prior Publication Data

US 2020/0344255 A1 Oct. 29, 2020

Related U.S. Application Data

(63) Continuation of application No. 15/944,908, filed on Apr. 4, 2018, now Pat. No. 10,757,123.

(Continued)

(51) Int. Cl.
*H04L 9/40* (2022.01)
*G06F 16/955* (2019.01)
*G06F 16/9535* (2019.01)

(52) U.S. Cl.
CPC ........ *H04L 63/1425* (2013.01); *G06F 16/955* (2019.01); *G06F 16/9535* (2019.01)

(58) Field of Classification Search
CPC .............. H04L 63/1425; G06F 16/955; G06F 16/9525; G06F 16/9535
See application file for complete search history.

(56) References Cited

U.S. PATENT DOCUMENTS 6,119,103 A 9/2000 Basch et al.
7,444,304 B2 10/2008 Mellinger et al.
(Continued)

OTHER PUBLICATIONS

Jan. 16, 2020 U.S. Non-Final Office Action—U.S. Appl. No. 15/944,908.

(Continued)

*Primary Examiner* — Catherine Thiaw
(74) *Attorney, Agent, or Firm* — Banner & Witcoff, Ltd.

(57) ABSTRACT

Aspects of the disclosure relate to deploying and utilizing a dynamic record identification and analysis computer system with event monitoring components. A computing device may receive account reconnaissance data identifying a first plurality of user accounts that have experienced at least one event associated with account security concern characteristics. The computing platform may analyze event history data associated with the first plurality of user accounts to identify one or more common interactions associated with a subset of the first plurality of user accounts. The computing platform may identify a point of compromise among the subset of the first plurality of user accounts. Subsequently, the computing platform may search enterprise user account records to identify a second plurality of user accounts that have at least one event associated with the point of compromise. The computing platform may add the second plurality of user accounts to an alert table.

15 Claims, 9 Drawing Sheets

Related U.S. Application Data

(60) Provisional application No. 62/621,855, filed on Jan. 25, 2018.

(56) References Cited

U.S. PATENT DOCUMENTS

| | | |
|---|---|---|
| 7,480,631 B1 | 1/2009 | Merced et al. |
| 8,024,367 B2 | 9/2011 | Heinzel et al. |
| 8,412,605 B2 | 4/2013 | Griffin et al. |
| 8,504,456 B2 | 8/2013 | Griffin et al. |
| 8,588,744 B2 | 11/2013 | Vendrow et al. |
| 8,589,298 B2 | 11/2013 | Choudhuri et al. |
| 8,626,663 B2 | 1/2014 | Nightengale et al. |
| 8,812,342 B2 | 8/2014 | Barcelo et al. |
| 9,485,265 B1 | 11/2016 | Saperstein et al. |
| 9,614,972 B2 | 4/2017 | Ballai et al. |
| 9,633,201 B1 | 4/2017 | Katz |
| 10,320,813 B1 * | 6/2019 | Ahmed ............ H04L 63/1441 |
| 10,681,060 B2 * | 6/2020 | Scheidler ............ G06F 21/566 |
| 2008/0319889 A1 | 12/2008 | Hammad |
| 2009/0144102 A1 | 6/2009 | Lopez |
| 2010/0169192 A1 | 7/2010 | Zoldi et al. |
| 2011/0087495 A1 | 4/2011 | O'Neill et al. |
| 2011/0131122 A1 | 6/2011 | Griffin et al. |
| 2013/0024376 A1 | 1/2013 | Choudhuri et al. |
| 2014/0201835 A1 | 7/2014 | Emigh et al. |
| 2015/0066772 A1 | 3/2015 | Griffin et al. |
| 2015/0156170 A1 | 6/2015 | Gurbani |
| 2016/0364727 A1 | 12/2016 | DeLawter et al. |
| 2017/0214712 A1 * | 7/2017 | Maxwell ............ G06F 21/46 |
| 2017/0237741 A1 | 8/2017 | Bell et al. |
| 2017/0237759 A1 | 8/2017 | Bell et al. |
| 2018/0004948 A1 | 1/2018 | Martin et al. |
| 2018/0060954 A1 | 3/2018 | Yin et al. |
| 2018/0063076 A1 | 3/2018 | Field |
| 2018/0063468 A1 | 3/2018 | Traina et al. |
| 2018/0068304 A1 | 3/2018 | Parker et al. |
| 2018/0068310 A1 | 3/2018 | Ene |
| 2018/0068316 A1 | 3/2018 | Essebag et al. |
| 2018/0068350 A1 | 3/2018 | Grosso |
| 2018/0068358 A1 | 3/2018 | Hoffberg |
| 2018/0069888 A1 | 3/2018 | Muddu et al. |
| 2018/0069929 A1 | 3/2018 | Sabbaghian et al. |
| 2018/0069936 A1 | 3/2018 | Kumnick |
| 2018/0075260 A1 | 3/2018 | Moreton et al. |
| 2018/0075440 A1 | 3/2018 | Beck et al. |
| 2018/0075447 A1 | 3/2018 | Moreton et al. |
| 2018/0075453 A1 | 3/2018 | Durvasula et al. |
| 2018/0077096 A1 | 3/2018 | DeMattei |
| 2018/0077153 A1 | 3/2018 | Connell, II et al. |
| 2018/0077160 A1 | 3/2018 | Call |
| 2018/0077256 A1 | 3/2018 | Fox |
| 2018/0078843 A1 | 3/2018 | Tran et al. |
| 2018/0081855 A1 | 3/2018 | Cormier et al. |
| 2018/0081955 A1 | 3/2018 | Gupta et al. |
| 2018/0082189 A1 | 3/2018 | Cormier et al. |
| 2018/0082190 A1 | 3/2018 | Cormier et al. |
| 2018/0082192 A1 | 3/2018 | Cormier et al. |
| 2018/0082193 A1 | 3/2018 | Cormier et al. |
| 2018/0082207 A1 | 3/2018 | Cormier et al. |
| 2018/0082208 A1 | 3/2018 | Cormier et al. |
| 2018/0082274 A1 | 3/2018 | Oulton et al. |
| 2018/0082277 A1 | 3/2018 | Sagan et al. |
| 2018/0082314 A1 | 3/2018 | Faith et al. |
| 2018/0082683 A1 | 3/2018 | Chen et al. |
| 2018/0083771 A1 | 3/2018 | Bonnell |
| 2018/0089403 A1 | 3/2018 | Watson et al. |
| 2018/0089419 A1 | 3/2018 | Loughlin-McHugh et al. |
| 2018/0089665 A1 | 3/2018 | Wright |
| 2018/0089678 A1 | 3/2018 | Metnick et al. |
| 2018/0089687 A1 | 3/2018 | Kohli |
| 2018/0089714 A1 | 3/2018 | Bhat et al. |
| 2018/0089729 A1 | 3/2018 | Metnick et al. |
| 2018/0089758 A1 | 3/2018 | Stradling et al. |
| 2018/0089759 A1 | 3/2018 | Stradling et al. |
| 2018/0089760 A1 | 3/2018 | Stradling et al. |
| 2018/0089761 A1 | 3/2018 | Stradling et al. |
| 2018/0089938 A1 | 3/2018 | Lutnick et al. |
| 2018/0089939 A1 | 3/2018 | Lyons et al. |
| 2018/0091316 A1 | 3/2018 | Stradling et al. |
| 2018/0091476 A1 | 3/2018 | Jakobsson et al. |
| 2018/0091478 A1 | 3/2018 | Jakobsson et al. |
| 2018/0091538 A1 | 3/2018 | Narayanan et al. |
| 2018/0205752 A1 | 7/2018 | Liu et al. |
| 2018/0255080 A1 | 9/2018 | Paine |
| 2019/0130404 A1 | 5/2019 | Merz et al. |

OTHER PUBLICATIONS

May 1, 2020 U.S. Notice of Allowance and Fees Due—U.S. Appl. No. 15/944,908.

Egele, Manuel, et al., "COMPA: Detecting Compromised Accounts on Social Networks", Carnegie Mellon University, Pittsburgh, PA, 2013, 17 pages (Year: 2013).

* cited by examiner

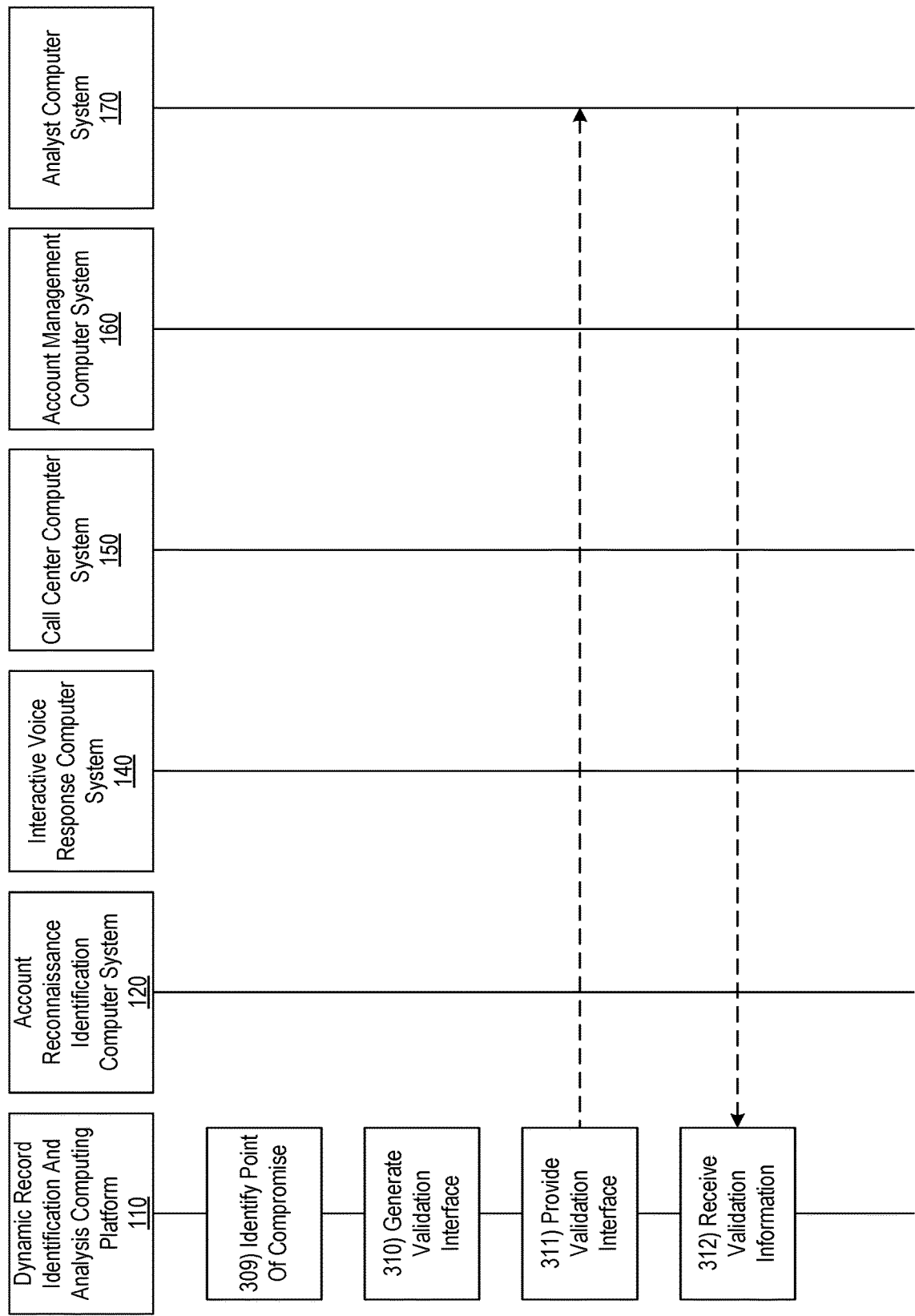

DYNAMIC RECORD IDENTIFICATION AND ANALYSIS COMPUTER SYSTEM WITH EVENT MONITORING COMPONENTS

CROSS-REFERENCE TO RELATED APPLICATIONS

This application claims the benefit of and is a continuation of U.S. patent application Ser. No. 15/944,908, filed Apr. 4, 2018, and entitled "Dynamic Record Identification And Analysis Computer System With Event Monitoring Components," which claims the benefit of and priority to U.S. Provisional Patent Application Ser. No. 62/621,855, filed Jan. 25, 2018, and entitled "Dynamic Record Identification And Analysis Computer System With Event Monitoring Components." Each of the foregoing application(s) is incorporated by reference herein in its entirety.

BACKGROUND

Aspects of the disclosure relate to computer hardware and software. In particular, one or more aspects of the disclosure relate to deploying and utilizing a dynamic record identification and analysis computer system with event monitoring components.

Computers are playing increasingly important roles in the daily lives of many people. For example, businesses and consumers are increasingly relying on computer hardware and software for a variety of purposes. Some computer systems may be utilized by organizations and other entities to maintain client information and/or support client-facing operations. As these systems are used to maintain ever-growing amounts of client information, it may be increasingly important to ensure the safety and security of such information. In many instances, however, it may be difficult to ensure the safety and security of such information while also optimizing the efficient and effective technical operations of such systems.

SUMMARY

Aspects of the disclosure provide effective, efficient, scalable, and convenient technical solutions that address and overcome the technical problems associated with maintaining and ensuring the safety and security of client information.

In accordance with one or more embodiments, a computing platform having at least one processor, a communication interface, and memory may receive account reconnaissance data identifying a first plurality of user accounts that have experienced at least one event associated with account security concern characteristics. Based on receiving the account reconnaissance data identifying the first plurality of user accounts that have experienced at least one event associated with account security concern characteristics, the computing platform may analyze event history data associated with the first plurality of user accounts to identify one or more common interactions associated with a subset of the first plurality of user accounts. Based on analyzing the event history data associated with the first plurality of user accounts to identify the one or more common interactions associated with the subset of the first plurality of user accounts, the computing platform may identify a point of compromise among the subset of the first plurality of user accounts, the point of compromise corresponding to a particular common interaction of the one or more common interactions. Subsequently, the computing platform may search enterprise user account records to identify a second plurality of user accounts that have at least one event associated with the point of compromise. Based on searching the enterprise user account records to identify the second plurality of user accounts, the computing platform may add the second plurality of user accounts to an alert table.

In some embodiments, identifying the point of compromise among the subset of the first plurality of user accounts may include identifying the point of compromise among the subset of the first plurality of user accounts based on transaction history information associated with the subset of the first plurality of user accounts. In some embodiments, identifying the point of compromise among the subset of the first plurality of user accounts may include identifying the point of compromise among the subset of the first plurality of user accounts based on merchant weighting information determined and maintained by the computing platform. In some embodiments, identifying the point of compromise among the subset of the first plurality of user accounts may include identifying the point of compromise among the subset of the first plurality of user accounts based on temporal grouping information determined and maintained by the computing platform.

In some embodiments, prior to receiving the account reconnaissance data identifying the first plurality of user accounts that have experienced at least one event associated with account security concern characteristics, the computing platform may receive, via the communication interface, from an account reconnaissance identification computer system, configuration information defining a data monitoring schedule for the computing platform. Subsequently, the computing platform may set one or more configuration preferences for the computing platform based on the configuration information defining the data monitoring schedule for the computing platform.

In some embodiments, prior to receiving the account reconnaissance data identifying the first plurality of user accounts that have experienced at least one event associated with account security concern characteristics, the computing platform may request, via the communication interface, from the account reconnaissance identification computer system, the account reconnaissance data identifying the first plurality of user accounts that have experienced at least one event associated with account security concern characteristics, based on the one or more configuration preferences.

In some embodiments, after receiving the account reconnaissance data identifying the first plurality of user accounts that have experienced at least one event associated with account security concern characteristics, the computing platform may send, via the communication interface, to an account management computer system, a request for account activity information associated with the first plurality of user accounts. Subsequently, the computing platform may receive, via the communication interface, from the account management computer system, the event history data associated with the first plurality of user accounts in response to the request for the account activity information associated with the first plurality of user accounts.

In some embodiments, the computing platform may load, from a merchant database maintained by the computing platform, merchant weighting information determined by the computing platform based on previously identified connections between one or more specific merchants and one or more specific occurrences of account reconnaissance activity. In addition, identifying the point of compromise among the subset of the first plurality of user accounts may include identifying the point of compromise among the subset of the first plurality of user accounts based on the merchant weighting information loaded from the merchant database maintained by the computing platform.

In some embodiments, based on identifying the point of compromise among the subset of the first plurality of user accounts, the computing platform may generate a validation user interface for a user of an analyst computer system, and the validation user interface may include at least one user-selectable element of a plurality of user-selectable elements enabling the user of the analyst computer system to provide input validating the point of compromise identified by the computing platform. Subsequently, the computing platform may provide, via the communication interface, to the analyst computer system, the validation user interface generated for the user of the analyst computer system. In addition, providing the validation user interface generated for the user of the analyst computer system to the analyst computer system may cause the analyst computer system to display the validation user interface to the user of the analyst computer system. Thereafter, the computing platform may receive, via the communication interface, from the analyst computer system, validation information indicating that the at least one user-selectable element of the plurality of user-selectable elements enabling the user of the analyst computer system to provide input validating the point of compromise identified by the computing platform has been selected by the user of the analyst computer system to validate the point of compromise identified by the computing platform.

In some embodiments, based on receiving the validation information from the analyst computer system, the computing platform may send, via the communication interface, to an account management computer system, a request for user account information. Subsequently, the computing platform may receive, via the communication interface, from the account management computer system, the enterprise user account records in response to the request for user account information.

In some embodiments, the computing platform may generate one or more system configuration commands based on adding the second plurality of user accounts to the alert table. Subsequently, the computing platform may send, via the communication interface, to an account management computer system, the one or more system configuration commands. In addition, sending the one or more system configuration commands to the account management computer system may cause the account management computer system to restrict transaction requests associated with the second plurality of user accounts processed by the account management computer system.

In some embodiments, the computing platform may send, via the communication interface, to an interactive voice response computer system, the one or more system configuration commands. In addition, sending the one or more system configuration commands to the interactive voice response computer system may cause the interactive voice response computer system to restrict access requests associated with the second plurality of user accounts processed by the interactive voice response computer system.

In some embodiments, the computing platform may send, via the communication interface, to a call center computer system, the one or more system configuration commands. In addition, sending the one or more system configuration commands to the call center computer system may cause the call center computer system to restrict access requests associated with the second plurality of user accounts processed by the call center computer system.

In some embodiments, the computing platform may send, via the communication interface, to one or more of an analyst computer system or a user computing device, one or more alert notifications based on adding the second plurality of user accounts to the alert table.

In some embodiments, the computing platform may update merchant weighting information maintained by the computing platform in a merchant database maintained by the computing platform based on adding the second plurality of user accounts to the alert table. In addition, updating the update merchant weighting information may include increasing or decreasing at least one weight applied to at least one specific merchant based on identifying the at least one specific merchant as the point of compromise.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A, 3B, 3C, 3D, and 3E depict an illustrative event sequence for deploying and utilizing a dynamic record identification and analysis computer system with event monitoring components in accordance with one or more example embodiments.

DETAILED DESCRIPTION

Figure 1A:
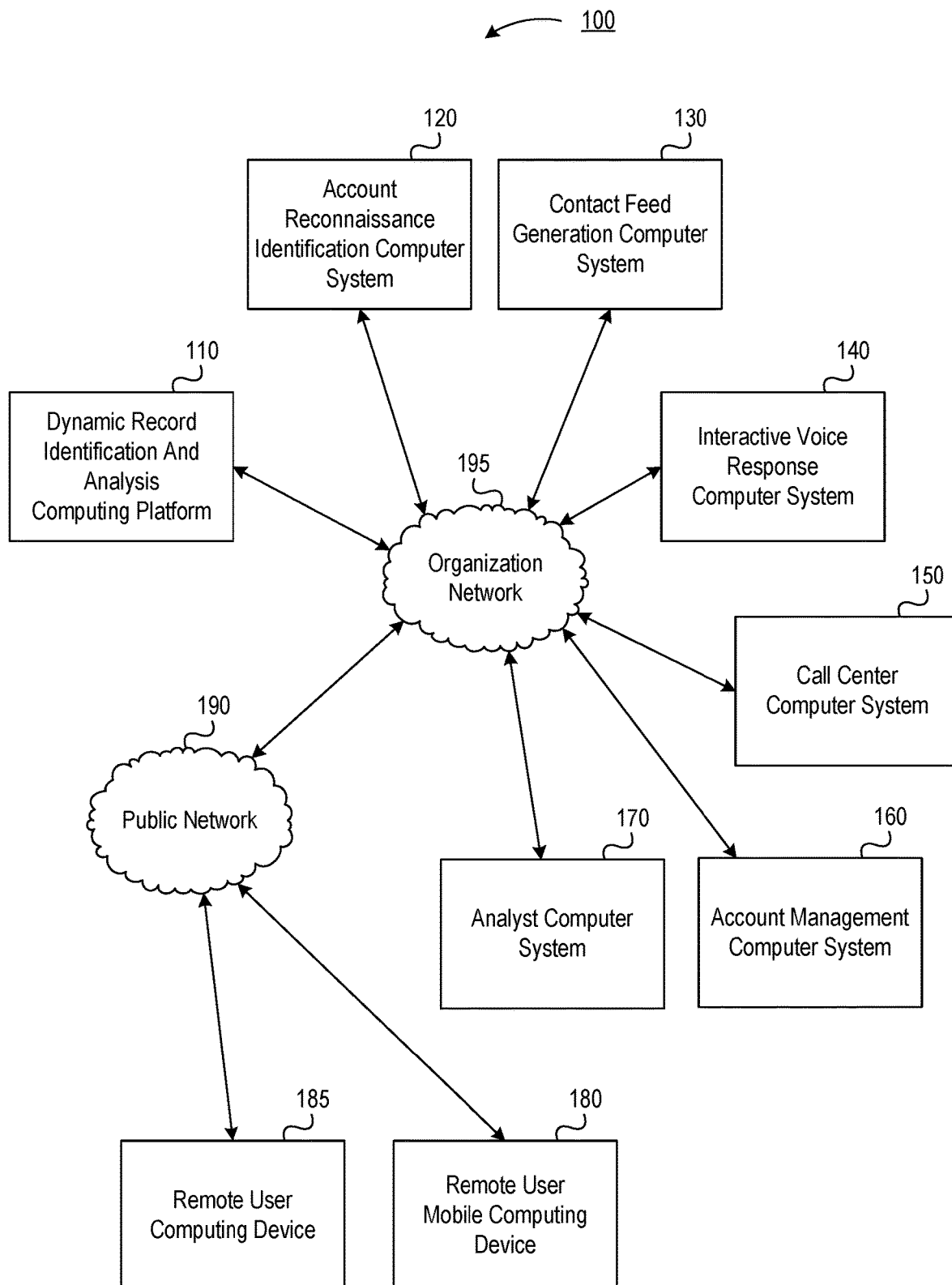
FIGS. 1A and 1B depict an illustrative computing environment for deploying and utilizing a dynamic record identification and analysis computer system with event monitoring components in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

In accordance with some aspects of the disclosure, a compromised merchant may be identified based on accounts having unauthorized contact. For example, when attempting to identify a merchant that may be compromised by one or more malicious actors hoping to intercept customer account data, a compromise detection system may rely on transaction records and/or other data associated with actual claims of authorized activity on accounts (e.g., corresponding to unauthorized transactions and/or transaction attempts) that have already occurred.

In many instances, claims associated with such unauthorized activity are either made by a customer or identified by a financial institution, and such claims often result from a customer's card data or other account details being taken from a merchant (e.g., who may unknowingly have systems infected with malware, hardware that has been retrofitted with skimming devices, or the like). A multitude of cases associated with these claims may be gathered and their corresponding transaction history may be compared, and common merchants where customers made valid transactions may be identified. These common merchants then may be analyzed to determine which merchant(s) are likely compromised and what mechanism was used to gain the unauthorized access at the outset.

By using this approach, however, there may be gaps in time between data being compromised to the compromise being identified to the effects being mitigated, and these gaps may allow more time for malicious parties to access more accounts without authorization. In addition, a number of cases of unauthorized access might need to occur for a common point of compromise to be determined with high confidence. In the meantime, a financial institution might be incurring (and might need to write off) various losses in connection with such unauthorized usage—a large percentage of which might not be recoverable—before any action may be taken to mitigate further losses. Using techniques described below, however, a financial institution may be able to identify accounts at risk of unauthorized activity due to compromised merchants without using actual unauthorized activity as the leading indicator for identifying such accounts, thereby decreasing the amount of time from compromise to detection and correspondingly minimizing losses incurred.

In some instances, when attempting to identify a compromised merchant, a computer system may start with a population of accounts with claims of unauthorized use and then track back to a merchant where a large number of those accounts made a valid charge. This commonality may indicate that the merchant may have been compromised and is driving the claims of unauthorized usage. In order to find compromised merchants without waiting for claims of unauthorized usage (which are associated with losses being incurred by a financial institution), aspects of the disclosure utilize a different type of leading indicator to build an initial population of accounts used in the analysis. In particular, aspects of the disclosure may utilize an indicator corresponding to suspicious or confirmed unauthorized phone contacts into a financial institution's call center (e.g., when a malicious actor is inquiring about a customer's account). To gain access to this level of inquiry, the malicious actor must hold some measure of information relating to the account and/or the customer. This type of activity may, in some instances, be referred to as Account Takeover (ATO) and often may result in unauthorized transactions being made using a customer's card and/or other account details.

In some instances, a population of accounts that have recently experienced these types of account reconnaissance calls may be gathered for analysis. Then, transaction data associated with all monetary transactions made prior to the contact and within a predetermined period of time may be retrieved from a system of record associated with monetary transactions. Such transaction data may include information identifying a transaction data and other data elements containing information associated with a merchant for each particular transaction, such as a merchant name, merchant address, merchant city and state, merchant ZIP code, and/or the like.

At this point in the analysis, a computer system may create a metric representing a distinct count of accounts that transacted at a given merchant. For example, out of ten accounts with unauthorized contact, five of these accounts may have transacted at the same pizza shop before the unauthorized contact.

Based on identifying this relationship, it may be predicted that there is a high likelihood that the pizza shop is compromised and any accounts that have transacted there or will transact there are at risk of future unauthorized activity. The customer system may identify additional accounts that are at risk due to the compromise at this merchant and treat such accounts accordingly. In addition, some of the same analytics used in cases where actual unauthorized use is the leading authenticator may be applied to this new population and/or mixed into the actual unauthorized usage population for improved results.

Since the adoption of chip card and EMV technology, it has become more difficult for malicious users to conduct unauthorized activity using stolen card data. As a result, there has been an increase in account takeover threats and other forms of unauthorized activity. This risk has also increased as more personal information becomes digitized and various corporate entities are subject to data breaches. In particular, a malicious user may be able to build a profile on a targeted customer that increases the malicious user's ability to access alternative channels, such as calls centers, in hopes of obtaining more information about a targeted customer and thereby creating a greater risk of card-not-present unauthorized activity.

Despite attempts to tighten authentication protecting access to these channels, it may be difficult for a financial institution to find challenging questions that only a true customer would know. This may remain an issue until the use of technologies like biometrics are implemented more fully. In the meantime, using a call center channel as a leading indicator of possible unauthorized activity may be an important step in combating recent changes in the landscape of unauthorized usage of accounts. Taking the identification of possible unauthorized usage a step further to locate common points of purchase may enable closer identification of possible data breaches at unsuspecting merchants. Some banks may rely on vendors to provide models and analytics that facilitate detection of unauthorized usage, often selecting only directly related data to send to the vendor. This in-house analytical program instead may rely on call center data which is a non-traditional data element for transactional unauthorized use and compromise detection.

Figure 1B:
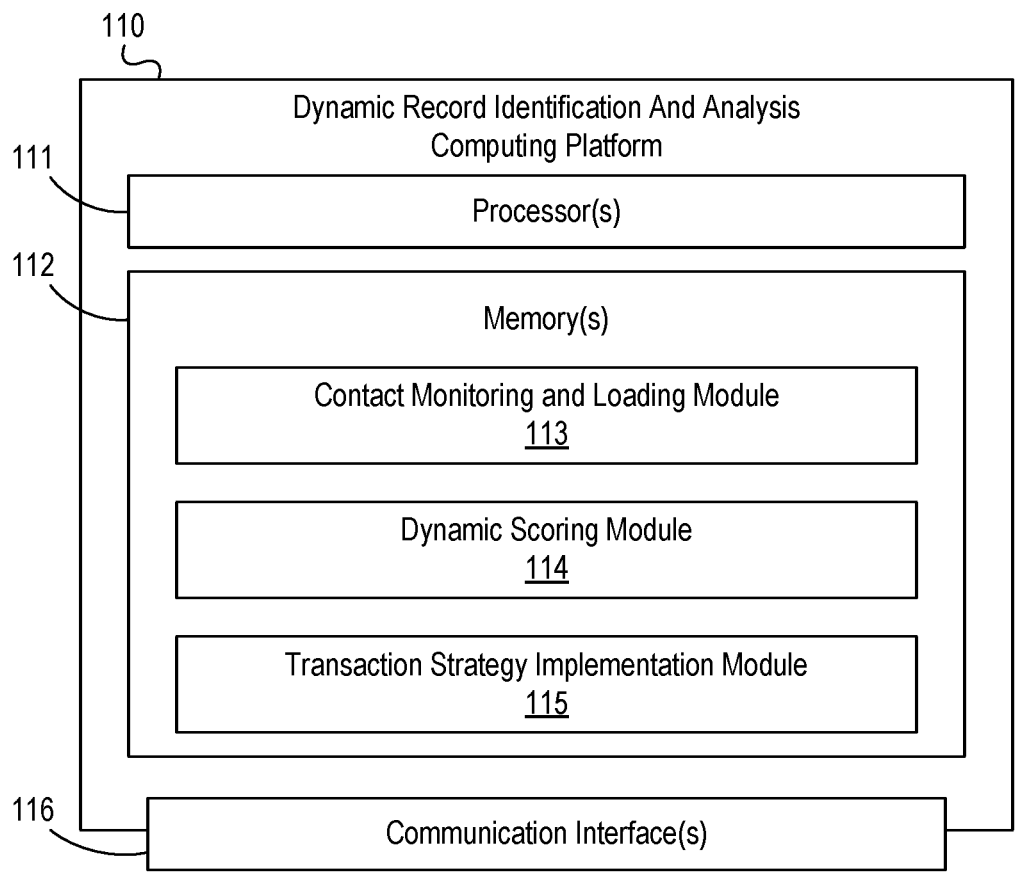

FIGS. 1A and 1B depict an illustrative computing environment for deploying and utilizing a dynamic record identification and analysis computer system with event monitoring components in accordance with one or more example embodiments. Referring to FIG. 1A, computing environment 100 may include one or more computing devices. For example, computing environment 100 may include an account reconnaissance identification computer system 120, a contact feed generation computer system 130, an interactive voice response computer system 140, a call center computer system 150, an account management computer system 160, an analyst computer system 170, a remote user mobile computing device 180, and a remote user computing device 185.

Account reconnaissance identification computer system 120 may be configured to receive and analyze call data to identify suspicious phone numbers (which may, e.g., be associated with one or more account reconnaissance activities) and/or produce blacklist data identifying such suspicious phone numbers based on such analysis. Contact feed generation computer system 130 may be configured to produce, generate, and/or share one or more contact feeds that include information identifying one or more specific contact events with one or more specific user accounts. Such a contact feed may, for instance, include event information indicating that a specific user account was accessed, touched, and/or otherwise contacted by a person or other entity utilizing a blacklisted phone number, blacklisted mobile malware, a blacklisted network address or cookie, a blacklisted email address, and/or the like. In some instances, contact feed generation computer system 130 may provide any and/or all of these contact feeds and/or event information to account reconnaissance identification computer system 120 (which may, e.g., store and/or maintain such information and, in some instances, share such information with dynamic record identification and analysis computing platform 110 as account reconnaissance data and/or as other data, as discussed in greater detail below).

Interactive voice response computer system 140 may include and/or interface with one or more interactive voice response (IVR) systems of an organization, such as a financial institution, which may provide automated telephone assistance to various users, including one or more customers of the organization. Call center computer system 150 may include and/or interface with one or more computer systems deployed in one or more call centers of an organization, such as a financial institution. Such computer systems may be configured to be used by one or more customer service representatives of the organization and may support call center operations of the organization, for instance, by allowing such customer service representatives to access, view, and/or modify user information and/or account information, such as financial account information.

Account management computer system 160 may be configured to store and/or maintain account information for one or more customers of an organization. For instance, account management computer system 160 may be configured to store and/or maintain account information for one or more customers of a financial institution. Analyst computer system 170 may include and/or interface with one or more computer systems used by one or more analysts of an organization, such as a financial institution. For instance, analyst computer system 170 may be configured to provide one or more interfaces that allow one or more analysts of an organization to access, view, and/or modify account information and/or other information, such as information associated with suspicious account activity, alert information, account takeover information, and/or the like.

Remote user mobile computing device 180 may be a mobile computing device (e.g., a smart phone, a tablet computer, a smart watch, a wearable device, or other mobile device) that is configured to be used by a remote user of an organization, such as a customer of a financial institution. Remote user computing device 185 may be a traditional computing device (e.g., a desktop computer, a laptop computer, or the like) that is configured to be used by a remote user of an organization, such as a customer of a financial institution.

In one or more arrangements, account reconnaissance identification computer system 120, contact feed generation computer system 130, interactive voice response computer system 140, call center computer system 150, account management computer system 160, analyst computer system 170, remote user mobile computing device 180, and remote user computing device 185 may be any type of computing device capable of receiving a user interface, receiving input via the user interface, and communicating the received input to one or more other computing devices. For example, account reconnaissance identification computer system 120, contact feed generation computer system 130, interactive voice response computer system 140, call center computer system 150, account management computer system 160, analyst computer system 170, remote user mobile computing device 180, and remote user computing device 185 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of account reconnaissance identification computer system 120, contact feed generation computer system 130, interactive voice response computer system 140, call center computer system 150, account management computer system 160, analyst computer system 170, remote user mobile computing device 180, and remote user computing device 185 may, in some instances, be special-purpose computing devices configured to perform specific functions.

Computing environment 100 also may include one or more computing platforms. For example, computing environment 100 may include dynamic record identification and analysis computing platform 110. As illustrated in greater detail below, dynamic record identification and analysis computing platform 110 may include one or more computing devices configured to perform one or more of the functions described herein. For example, dynamic record identification and analysis computing platform 110 may include one or more computers (e.g., laptop computers, desktop computers, servers, server blades, or the like).

Computing environment 100 also may include one or more networks, which may interconnect one or more of dynamic record identification and analysis computing platform 110, account reconnaissance identification computer system 120, contact feed generation computer system 130, interactive voice response computer system 140, call center computer system 150, account management computer system 160, analyst computer system 170, remote user mobile computing device 180, and remote user computing device 185. For example, computing environment 100 may include organization network 195 and public network 190. Organization network 195 and/or public network 190 may include one or more sub-networks (e.g., local area networks (LANs), wide area networks (WANs), or the like). Organization network 195 may be associated with a particular organization (e.g., a corporation, financial institution, educational institution, governmental institution, or the like) and may interconnect one or more computing devices associated with the organization. For example, dynamic record identification and analysis computing platform 110, account reconnaissance identification computer system 120, contact feed generation computer system 130, interactive voice response computer system 140, call center computer system 150, account management computer system 160, and analyst computer system 170 may be associated with an organization (e.g., a financial institution), and organization network 195 may be associated with and/or operated by the organization, and may include one or more networks (e.g., LANs, WANs, virtual private networks (VPNs), or the like) that interconnect dynamic record identification and analysis computing platform 110, account reconnaissance identification computer system 120, contact feed generation computer system 130, interactive voice response computer system 140, call center computer system 150, account management computer system 160, and analyst computer system 170 and one or more other computing devices and/or computer systems that are used by, operated by, and/or otherwise associated with the organization. Public network 190 may connect organization network 195 and/or one or more computing devices connected thereto (e.g., dynamic record identification and analysis computing platform 110, account reconnaissance identification computer system 120, contact feed generation computer system 130, interactive voice response computer system 140, call center computer system 150, account management computer system 160, and analyst computer system 170) with one or more networks and/or computing devices that are not associated with the organization. For example, remote user mobile computing device 180 and remote user computing device 185 might not be associated with an organization that operates organization network 195 (e.g., because remote user mobile computing device 180 and remote user computing device 185 may be owned and/or operated by one or more entities different from the organization that operates organization network 195, such as one or more customers of the organization and/or vendors of the organization, rather than being owned and/or operated by the organization itself or an employee or affiliate of the organization), and public network 190 may include one or more networks (e.g., the internet) that connect remote user mobile computing device 180 and remote user computing device 185 to organization network 195 and/or one or more computing devices connected thereto (e.g., dynamic record identification and analysis computing platform 110, account reconnaissance identification computer system 120, contact feed generation computer system 130, interactive voice response computer system 140, call center computer system 150, account management computer system 160, and analyst computer system 170).

Referring to FIG. 1B, dynamic record identification and analysis computing platform 110 may include one or more processors 111, memory 112, and communication interface 116. A data bus may interconnect processor(s) 111, memory 112, and communication interface 116. Communication interface 116 may be a network interface configured to support communication between dynamic record identification and analysis computing platform 110 and one or more networks (e.g., organization network 195, public network 190, or the like). Memory 112 may include one or more program modules having instructions that when executed by processor(s) 111 cause dynamic record identification and analysis computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic record identification and analysis computing platform 110 and/or by different computing devices that may form and/or otherwise make up dynamic record identification and analysis computing platform 110. For example, memory 112 may include a contact monitoring and loading module 113, a dynamic scoring module 114, and a transaction strategy implementation module 115. Contact monitoring and loading module 113 may provide and/or perform one or more functions that enable and/or cause dynamic record identification and analysis computing platform 110 to monitor one or more contacts and/or other events (e.g., privacy events, failed authentication events, and/or other events) that involve and/or are otherwise associated with one or more user accounts, including one or more user accounts that are used by and/or are otherwise associated with one or more customers. Additionally or alternatively, contact monitoring and loading module 113 may provide and/or perform one or more functions that enable and/or cause dynamic record identification and analysis computing platform 110 to load one or more user accounts, including one or more user accounts that are used by and/or are otherwise associated with one or more customers, into one or more alert tables. Dynamic scoring module 114 may provide and/or perform one or more functions that enable and/or cause dynamic record identification and analysis computing platform 110 to calculate one or more alert scores for one or more user accounts on an on-demand basis and/or on a periodic and/or predetermined basis (e.g., hourly, daily, weekly, and/or the like). Transaction strategy implementation module 115 may provide and/or perform one or more functions that enable and/or cause dynamic record identification and analysis computing platform 110 to perform one or more actions on and/or with respect to one or more user accounts, for instance, based on a risk score associated with a particular user account, based on an event that has occurred involving a particular user account, and/or the like.

Figure 2:
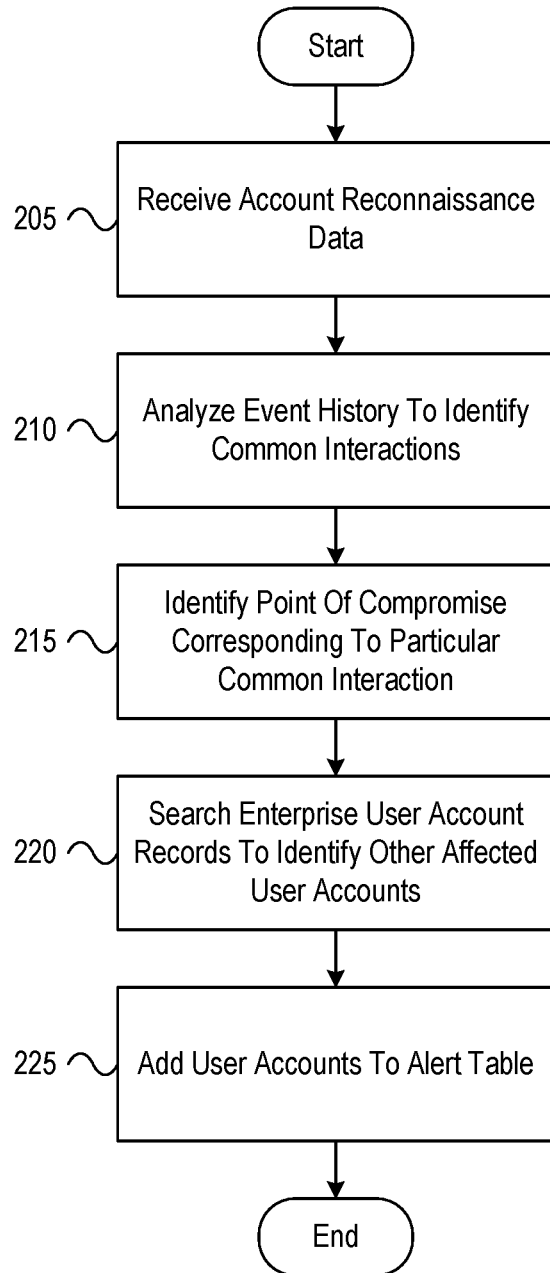
FIG. 2 depicts an illustrative method for deploying and utilizing a dynamic record identification and analysis computer system with event monitoring components in accordance with one or more example embodiments.

FIG. 2 depicts an illustrative method for deploying and utilizing a dynamic record identification and analysis computer system with event monitoring components in accordance with one or more example embodiments. Referring to FIG. 2, at step 205, a computing platform may receive account reconnaissance data identifying a first plurality of user accounts that have experienced at least one event associated with account security concern characteristics. For example, at step 205, dynamic record identification and analysis computing platform 110 may receive (e.g., from account reconnaissance identification computer system 120 and/or other systems in computing environment 100), data identifying one or more user accounts that have experienced account reconnaissance activity and/or other suspicious activity.

At step 210, based on receiving the account reconnaissance data identifying the first plurality of user accounts that have experienced at least one event associated with account security concern characteristics, the computing platform may analyze event history data associated with the first plurality of user accounts to identify one or more common interactions associated with a subset of the first plurality of user accounts. For example, at step 210, dynamic record identification and analysis computing platform 110 may analyze transaction history data for the identified accounts to identify common merchants (e.g., where valid transactions occurred before account reconnaissance activity and/or other suspicious activity occurred).

At step 215, based on analyzing the event history data associated with the first plurality of user accounts to identify the one or more common interactions associated with the subset of the first plurality of user accounts, the computing platform may identify a point of compromise among the subset of the first plurality of user accounts, the point of compromise corresponding to a particular common interaction of the one or more common interactions. For example, at step 215, dynamic record identification and analysis computing platform 110 may determine a point of compromise by weighing different interactions at different merchants differently (e.g., based on merchant type and/or other factors) and/or by temporally grouping interactions with certain merchants. For instance, dynamic record identification and analysis computing platform 110 may weigh transactions at certain specific-service merchants (e.g., barbershops, pizza shops, or the like) more heavily than general-service merchants (e.g., grocery stores, supply stores, gas stations, or the like).

At step 220, the computing platform may search enterprise user account records to identify a second plurality of user accounts that have at least one event associated with the point of compromise. For example, at step 220, dynamic record identification and analysis computing platform 110 may identify all accounts that had a transaction with the merchant identified as the point of compromise (e.g., potentially within a particular time period) as these accounts may be at heightened risk going forward, even if these accounts have not yet experienced actual unauthorized usage or even account reconnaissance activity or other suspicious activity.

At step 225, based on searching the enterprise user account records to identify the second plurality of user accounts, the computing platform may add the second plurality of user accounts to an alert table. For example, at step 225, dynamic record identification and analysis computing platform 110 may add the identified accounts to a high-risk monitoring table for additional monitoring, heightened scrutiny, and/or enhanced security. Additionally or alternatively, dynamic record identification and analysis computing platform 110 may generate and/or send one or more alerts and/or notifications associated with such accounts to call center computer system 150, account management computer system 160, and analyst computer system 170 and one or more other computing devices and/or computer systems that are used by, operated by, and/or otherwise associated with the organization.

Figure 3A:
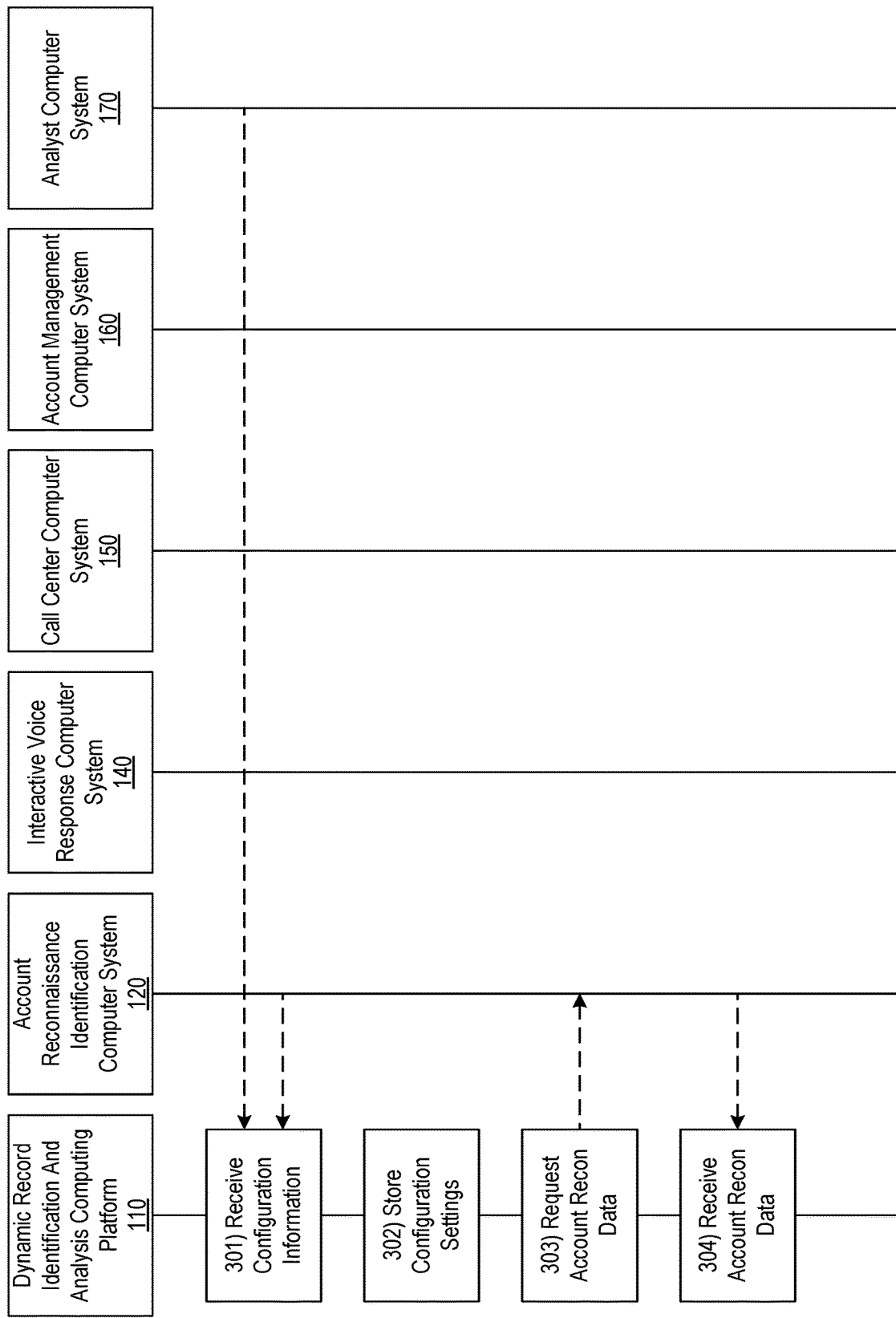

FIGS. 3A, 3B, 3C, 3D, and 3E depict an illustrative event sequence for deploying and utilizing a dynamic record identification and analysis computer system with event monitoring components in accordance with one or more example embodiments. Referring to FIG. 3A, at step 301, dynamic record identification and analysis computing platform 110 may receive configuration information from account reconnaissance identification computer system 120 and/or analyst computer system 170. For example, at step 301, dynamic record identification and analysis computing platform 110 may receive, via a communication interface (e.g., communication interface 116), from an account reconnaissance identification computer system (e.g., account reconnaissance identification computer system 120), configuration information defining a data monitoring schedule for the computing platform (e.g., dynamic record identification and analysis computing platform 110).

At step 302, dynamic record identification and analysis computing platform 110 may store one or more configuration settings (which may, e.g., cause dynamic record identification and analysis computing platform 110 to continuously monitor and/or process data received from account reconnaissance identification computer system 120, to make periodic requests for data from account reconnaissance identification computer system 120, and/or the like). For example, at step 302, dynamic record identification and analysis computing platform 110 may set one or more configuration preferences for the computing platform (e.g., dynamic record identification and analysis computing platform 110) based on the configuration information defining the data monitoring schedule for the computing platform (e.g., dynamic record identification and analysis computing platform 110).

At step 303, dynamic record identification and analysis computing platform 110 may request account reconnaissance data from account reconnaissance identification computer system 120. For example, at step 303, dynamic record identification and analysis computing platform 110 may request, via the communication interface (e.g., communication interface 116), from the account reconnaissance identification computer system (e.g., account reconnaissance identification computer system 120), the account reconnaissance data identifying the first plurality of user accounts that have experienced at least one event associated with account security concern characteristics, based on the one or more configuration preferences (which may, e.g., have been stored by dynamic record identification and analysis computing platform 110 at step 302).

At step 304, dynamic record identification and analysis computing platform 110 may receive account reconnaissance data from account reconnaissance identification computer system 120, and such account reconnaissance data may, for instance, identify and/or otherwise indicate one or more accounts that have experienced account reconnaissance events and/or other events associated with account security concerns. For example, at step 304, dynamic record identification and analysis computing platform 110 may receive (e.g., from account reconnaissance identification computer system 120) account reconnaissance data identifying a first plurality of user accounts that have experienced at least one event associated with account security concern characteristics.

Figure 3B:
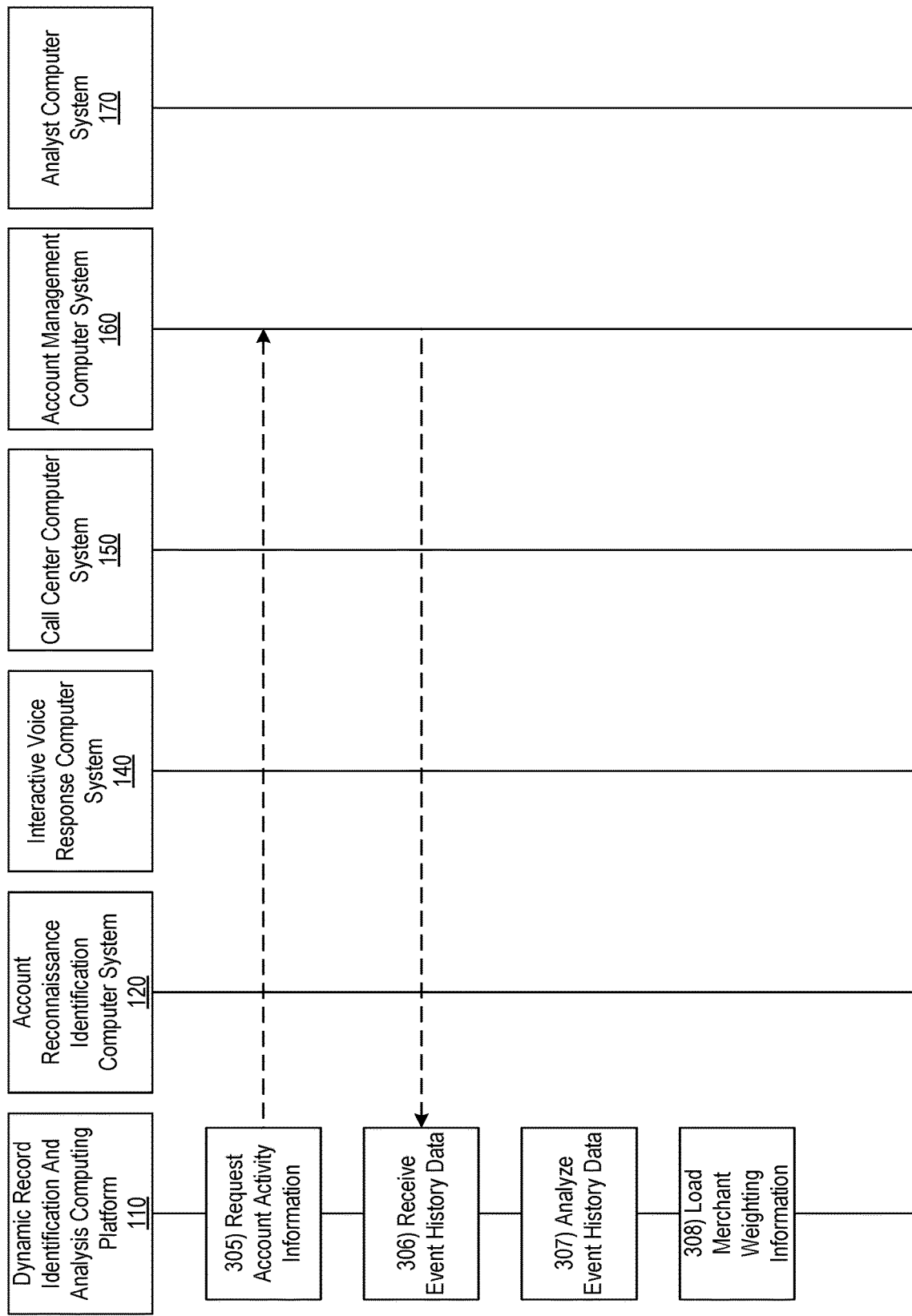

Referring to FIG. 3B, at step 305, dynamic record identification and analysis computing platform 110 may request account activity information (e.g., for specific accounts) from account management computer system 160. For example, at step 305, after receiving the account reconnaissance data identifying the first plurality of user accounts that have experienced at least one event associated with account security concern characteristics, dynamic record identification and analysis computing platform 110 may send, via the communication interface (e.g., communication interface 116), to an account management computer system (e.g., account management computer system 160), a request for account activity information associated with the first plurality of user accounts.

At step 306, dynamic record identification and analysis computing platform 110 may receive event history data (e.g., for specific accounts) from account management computer system 160. For example, at step 306, dynamic record identification and analysis computing platform 110 may receive, via the communication interface (e.g., communication interface 116), from the account management computer system (e.g., account management computer system 160), the event history data associated with the first plurality of user accounts in response to the request for the account activity information associated with the first plurality of user accounts.

At step 307, dynamic record identification and analysis computing platform 110 may analyze event history data (which may, e.g., include transaction history information) to identify common merchants that were interacted with among the specific accounts. For example, at step 307, based on receiving the account reconnaissance data identifying the first plurality of user accounts that have experienced at least one event associated with account security concern characteristics, dynamic record identification and analysis computing platform 110 may analyze event history data associated with the first plurality of user accounts to identify one or more common interactions associated with a subset of the first plurality of user accounts. As illustrated below, by identifying common interactions and/or common merchants, dynamic record identification and analysis computing platform 110 may be able to determine and/or otherwise identify specific merchant(s) at which account information was obtained for unauthorized use by a malicious entity and which may correspondingly be considered point(s) of compromise.

At step 308, dynamic record identification and analysis computing platform 110 may load merchant weighting information. For example, at step 308, dynamic record identification and analysis computing platform 110 may load, from a merchant database maintained by the computing platform (e.g., dynamic record identification and analysis computing platform 110), merchant weighting information determined by the computing platform (e.g., dynamic record identification and analysis computing platform 110) based on previously identified connections between one or more specific merchants and one or more specific occurrences of account reconnaissance activity. In addition, in identifying the point of compromise among the subset of the first plurality of user accounts (e.g., at step 309 as discussed below), dynamic record identification and analysis computing platform 110 may identify the point of compromise among the subset of the first plurality of user accounts based on the merchant weighting information loaded from the merchant database maintained by the computing platform (e.g., dynamic record identification and analysis computing platform 110). For instance, certain types of common interactions and/or common merchants may be more likely to be points of compromise than others, and these variations may be reflected in and/or accounted for by the merchant weighting information.

Referring to FIG. 3C, at step 309, dynamic record identification and analysis computing platform 110 may identify a point of compromise (e.g., based on the event history data). For example, at step 309, based on analyzing the event history data associated with the first plurality of user accounts to identify the one or more common interactions associated with the subset of the first plurality of user accounts, dynamic record identification and analysis computing platform 110 may identify a point of compromise among the subset of the first plurality of user accounts, and the point of compromise may correspond to a particular common interaction of the one or more common interactions. For instance, the point of compromise may be a specific merchant where each user account of the subset of the first plurality of user accounts conducted one or more transactions.

In some embodiments, identifying the point of compromise among the subset of the first plurality of user accounts may include identifying the point of compromise among the subset of the first plurality of user accounts based on transaction history information associated with the subset of the first plurality of user accounts. For example, in identifying the point of compromise among the subset of the first plurality of user accounts, dynamic record identification and analysis computing platform 110 may identify the point of compromise among the subset of the first plurality of user accounts based on transaction history information associated with the subset of the first plurality of user accounts. Such transaction history information may, for instance, be obtained by dynamic record identification and analysis computing platform 110 from account management computer system 160 as part of other information received from account management computer system 160.

In some embodiments, identifying the point of compromise among the subset of the first plurality of user accounts may include identifying the point of compromise among the subset of the first plurality of user accounts based on merchant weighting information determined and maintained by the computing platform. For example, in identifying the point of compromise among the subset of the first plurality of user accounts, dynamic record identification and analysis computing platform 110 may identify the point of compromise among the subset of the first plurality of user accounts based on merchant weighting information determined and maintained by the computing platform (e.g., dynamic record identification and analysis computing platform 110). For instance, dynamic record identification and analysis computing platform 110 may identify the point of compromise among the subset of the first plurality of user accounts based on the merchant weighting information discussed above, so as to treat some merchants differently from other merchants when attempting to determine the point of compromise.

In some embodiments, identifying the point of compromise among the subset of the first plurality of user accounts may include identifying the point of compromise among the subset of the first plurality of user accounts based on temporal grouping information determined and maintained by the computing platform. For example, in identifying the point of compromise among the subset of the first plurality of user accounts, dynamic record identification and analysis computing platform 110 may identify the point of compromise among the subset of the first plurality of user accounts based on temporal grouping information determined and maintained by the computing platform (e.g., dynamic record identification and analysis computing platform 110). For instance, dynamic record identification and analysis computing platform 110 may identify the point of compromise among the subset of the first plurality of user accounts based on specific accounts having similar transactions at a common merchant within a particular time window or other predefined period of time (e.g., on the same, within three days of each other, within the same week, or the like). Such temporal grouping information may, for instance, define the time windows used by dynamic record identification and analysis computing platform 110 in determining whether particular transactions by different user accounts at the same merchant should be grouped for purposes of identifying the point of compromise.

At step 310, dynamic record identification and analysis computing platform 110 may generate a validation interface (which may, e.g., be provided to an administrative user to confirm and/or otherwise validate the point of compromise identified by dynamic record identification and analysis computing platform 110). For example, at step 310, based on identifying the point of compromise among the subset of the first plurality of user accounts, dynamic record identification and analysis computing platform 110 may generate a validation user interface for a user of an analyst computer system (e.g., analyst computer system 170). In addition, the validation user interface may include at least one user-selectable element of a plurality of user-selectable elements enabling the user of the analyst computer system (e.g., analyst computer system 170) to provide input validating the point of compromise identified by the computing platform (e.g., dynamic record identification and analysis computing platform 110).

Figure 4:
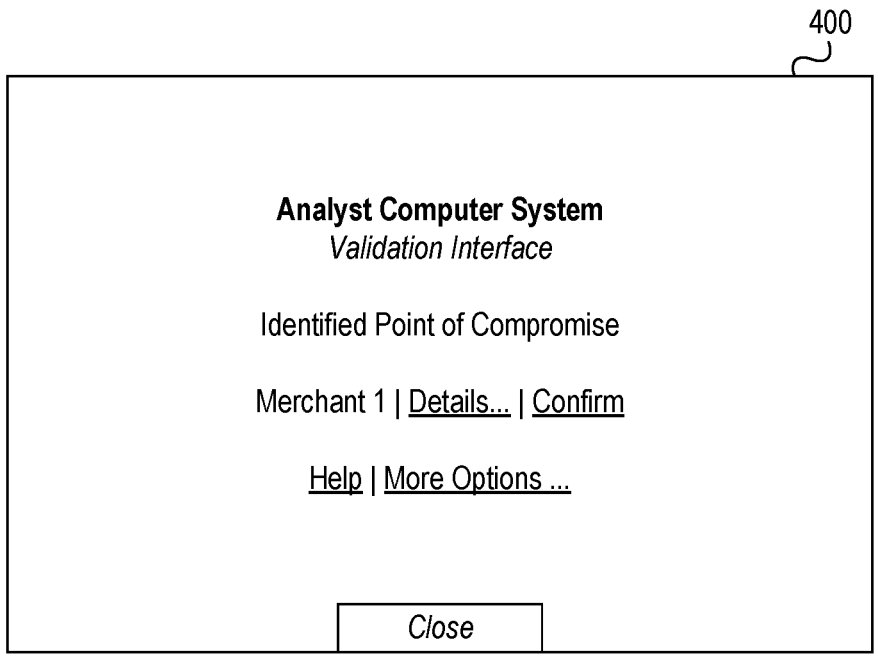
FIGS. 4 and 5 depict example graphical user interfaces for deploying and utilizing a dynamic record identification and analysis computer system with event monitoring components in accordance with one or more example embodiments.

At step 311, dynamic record identification and analysis computing platform 110 may send and/or otherwise provide the validation interface to analyst computer system 170. For example, at step 311, dynamic record identification and analysis computing platform 110 may provide, via the communication interface (e.g., communication interface 116), to the analyst computer system (e.g., analyst computer system 170), the validation user interface generated for the user of the analyst computer system (e.g., analyst computer system 170). In addition, providing the validation user interface generated for the user of the analyst computer system (e.g., analyst computer system 170) to the analyst computer system (e.g., analyst computer system 170) may cause the analyst computer system (e.g., analyst computer system 170) to display the validation user interface to the user of the analyst computer system (e.g., analyst computer system 170). In some instances, in providing the validation user interface generated for the user of the analyst computer system (e.g., analyst computer system 170) to the analyst computer system (e.g., analyst computer system 170), dynamic record identification and analysis computing platform 110 may cause the analyst computer system (e.g., analyst computer system 170) to display and/or otherwise present a graphical user interface similar to graphical user interface 400, which is depicted to in FIG. 4. As seen in FIG. 4, graphical user interface 400 may include information identifying a particular merchant determined to be a point of compromise by dynamic record identification and analysis computing platform 110, a user-selectable element enabling the user of analyst computer system 170 to confirm, approve, and/or otherwise validate this determination made by dynamic record identification and analysis computing platform 110, and/or one or more other user-selectable elements enabling the user of analyst computer system 170 to view additional information about the merchant and/or the determination made by dynamic record identification and analysis computing platform 110 and/or access other commands and/or options.

At step 312, dynamic record identification and analysis computing platform 110 may receive validation information (e.g., from the user of analyst computer system 170, confirming that the identified point of compromise is valid and/or correct, and/or provided via the above-described graphical user interface). For example, at step 312, dynamic record identification and analysis computing platform 110 may receive, via the communication interface (e.g., communication interface 116), from the analyst computer system (e.g., analyst computer system 170), validation information indicating that the at least one user-selectable element of the plurality of user-selectable elements enabling the user of the analyst computer system (e.g., analyst computer system 170) to provide input validating the point of compromise identified by the computing platform (e.g., dynamic record identification and analysis computing platform 110) has been selected by the user of the analyst computer system (e.g., analyst computer system 170) to validate the point of compromise identified by the computing platform (e.g., dynamic record identification and analysis computing platform 110).

Figure 3D:
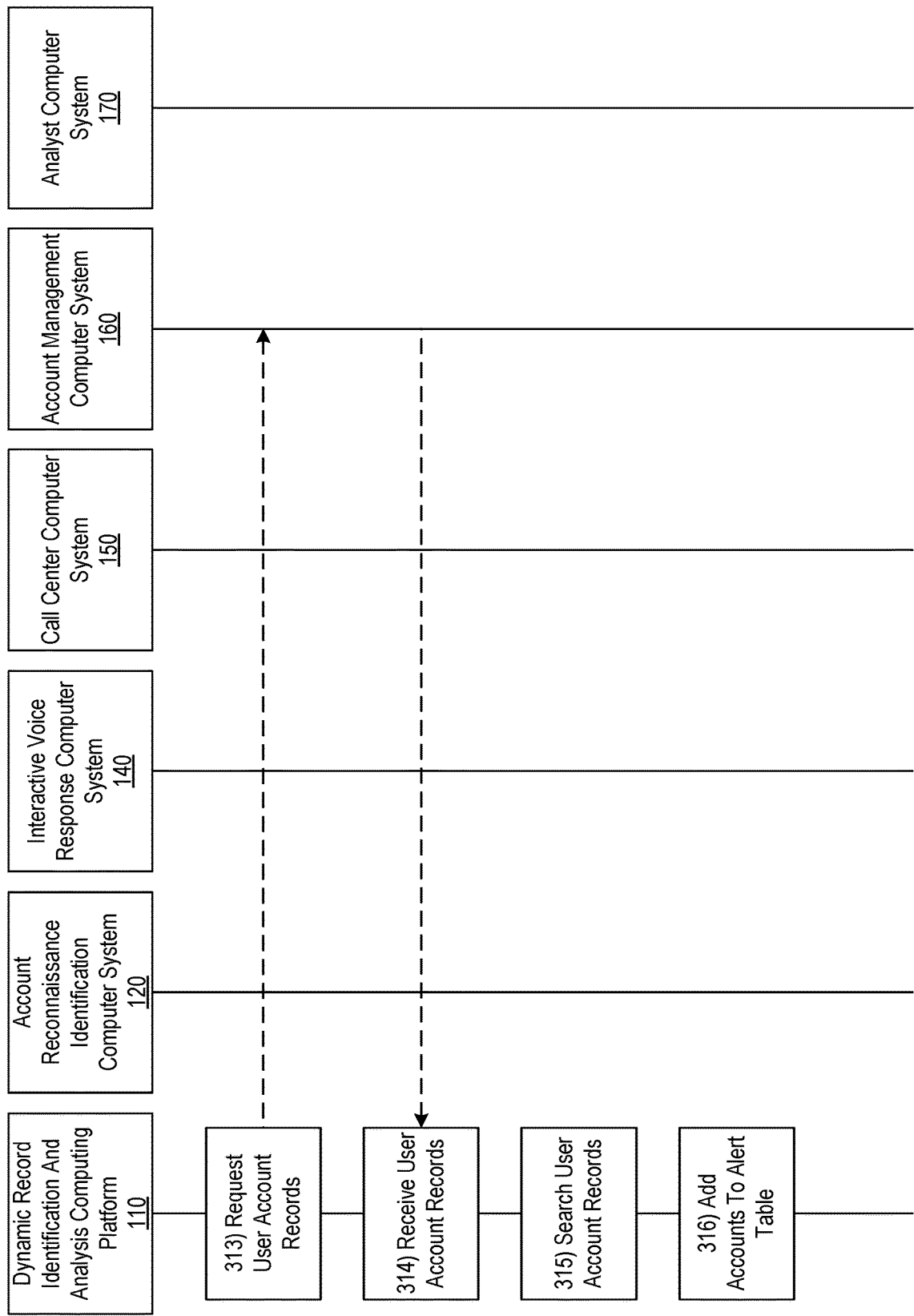

Referring to FIG. 3D, at step 313, dynamic record identification and analysis computing platform 110 may request user account records from account management computer system 160. For example, at step 313, based on receiving the validation information from the analyst computer system (e.g., analyst computer system 170), dynamic record identification and analysis computing platform 110 may send, via the communication interface (e.g., communication interface 116), to an account management computer system (e.g., account management computer system 160), a request for user account information. In some instances, dynamic record identification and analysis computing platform 110 may request user account records from account management computer system 160 that are associated with a specific and/or limited geographic area, such as user accounts with billing addresses located within a predetermined distance of the merchant identified as the point of compromise, so that the obtained user records are relevant to the processing being performed by dynamic record identification and analysis computing platform 110. Additionally or alternatively, dynamic record identification and analysis computing platform 110 may request user account records from account management computer system 160 that are associated with a specific and/or limited timeframe, such as user accounts that visited the merchant identified as the point of compromise within a specific time period (e.g., a particular week, a particular month, or the like), so that the obtained user records are relevant to the processing being performed by dynamic record identification and analysis computing platform 110.

At step 314, dynamic record identification and analysis computing platform 110 may receive user account records from account management computer system 160. For example, at step 314, dynamic record identification and analysis computing platform 110 may receive, via the communication interface (e.g., communication interface 116), from the account management computer system (e.g., account management computer system 160), the enterprise user account records in response to the request for user account information.

At step 315, dynamic record identification and analysis computing platform 110 may search user account records (e.g., to identify accounts that have had events associated with the point of compromise). For example, at step 315, dynamic record identification and analysis computing platform 110 may search enterprise user account records to identify a second plurality of user accounts that have at least one event associated with the point of compromise. For instance, dynamic record identification and analysis computing platform 110 may search enterprise user account records to identify user accounts in which at least one transaction has occurred involving the merchant identified as the point of compromise.

At step 316, dynamic record identification and analysis computing platform 110 may add the identified user accounts to an alert table (which may be maintained by dynamic record identification and analysis computing platform 110 and/or account reconnaissance identification computer system 120). For example, at step 316, based on searching the enterprise user account records to identify the second plurality of user accounts, dynamic record identification and analysis computing platform 110 may add the second plurality of user accounts to an alert table. As illustrated below, user accounts included in the alert table may be subject to heightened security and monitoring, as such accounts may be considered to be at risk of having unauthorized account activity.

Figure 3E:
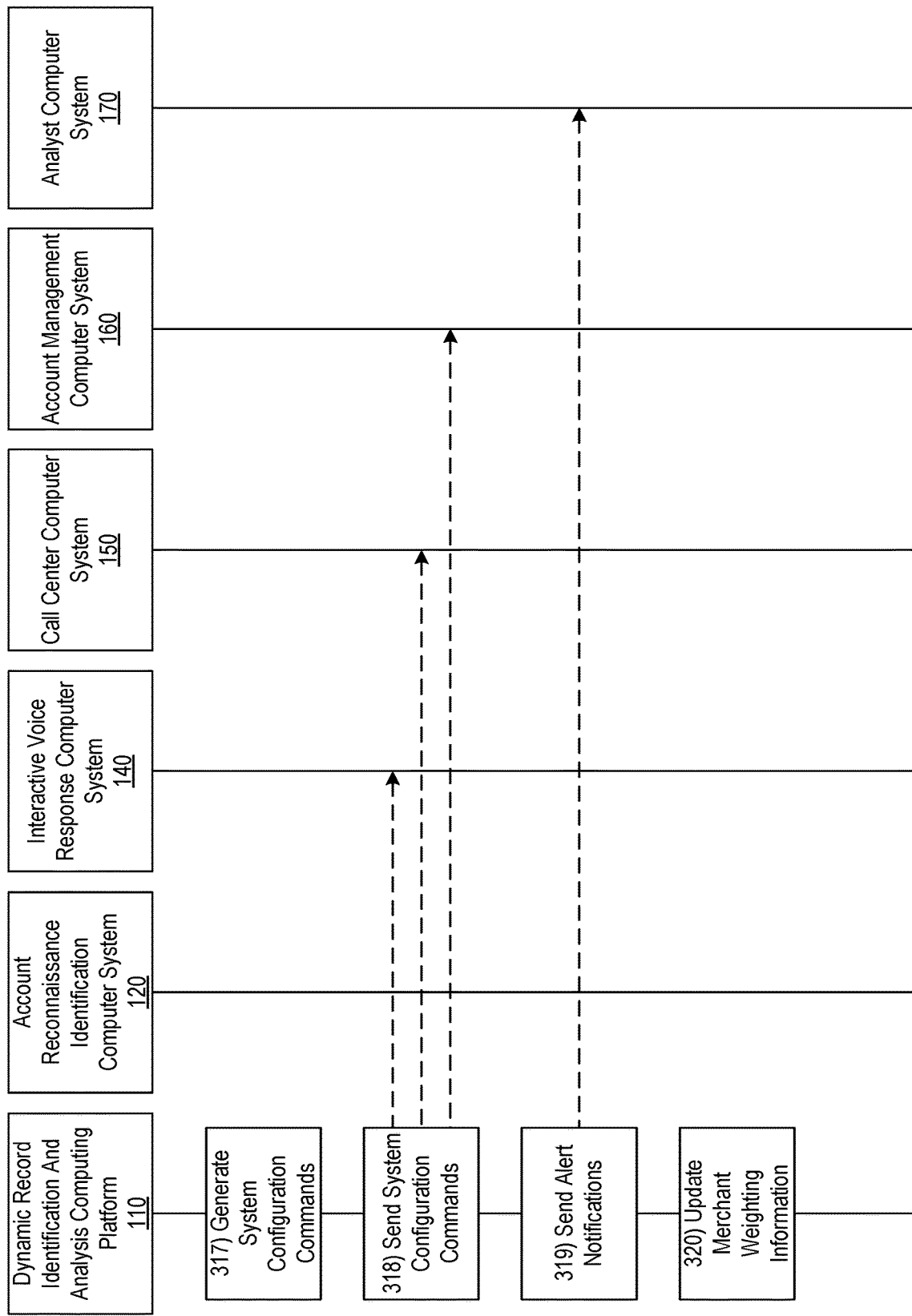

Referring to FIG. 3E, at step 317, dynamic record identification and analysis computing platform 110 may generate one or more system configuration commands (e.g., based on the alert table). For example, at step 317, dynamic record identification and analysis computing platform 110 may generate one or more system configuration commands based on adding the second plurality of user accounts to the alert table.

At step 318, dynamic record identification and analysis computing platform 110 may send the one or more system configuration commands to one or more of interactive voice response computer system 140, call center computer system 150, account management computer system 160, and/or one or more other systems and/or devices. As illustrated below, the one or more system configuration commands may cause these systems and/or devices to apply additional security measures when authenticating users to user accounts included in the alert table, to apply additional security measures when approving or denying transactions involving user accounts included in the alert table, and/or to apply additional security measures when performing other actions involving user accounts included in the alert table.

For example, at step 318, dynamic record identification and analysis computing platform 110 may send, via the communication interface (e.g., communication interface 116), to an account management computer system (e.g., account management computer system 160), the one or more system configuration commands. In addition, in sending the one or more system configuration commands to the account management computer system (e.g., account management computer system 160), dynamic record identification and analysis computing platform 110 may causes the account management computer system (e.g., account management computer system 160) to restrict transaction requests associated with the second plurality of user accounts processed by the account management computer system (e.g., account management computer system 160).

Additionally or alternatively, at step 318, dynamic record identification and analysis computing platform 110 may send, via the communication interface (e.g., communication interface 116), to an interactive voice response computer system (e.g., interactive voice response computer system 140), the one or more system configuration commands. In addition, in sending the one or more system configuration commands to the interactive voice response computer system (e.g., interactive voice response computer system 140), dynamic record identification and analysis computing platform 110 may cause the interactive voice response computer system (e.g., interactive voice response computer system 140) to restrict access requests associated with the second plurality of user accounts processed by the interactive voice response computer system (e.g., interactive voice response computer system 140).

Additionally or alternatively, at step 318, dynamic record identification and analysis computing platform 110 may send, via the communication interface (e.g., communication interface 116), to a call center computer system (e.g., call center computer system 150), the one or more system configuration commands. In addition, in sending the one or more system configuration commands to the call center computer system (e.g., call center computer system 150), dynamic record identification and analysis computing platform 110 may cause the call center computer system (e.g., call center computer system 150) to restrict access requests associated with the second plurality of user accounts processed by the call center computer system (e.g., call center computer system 150).

Figure 5:
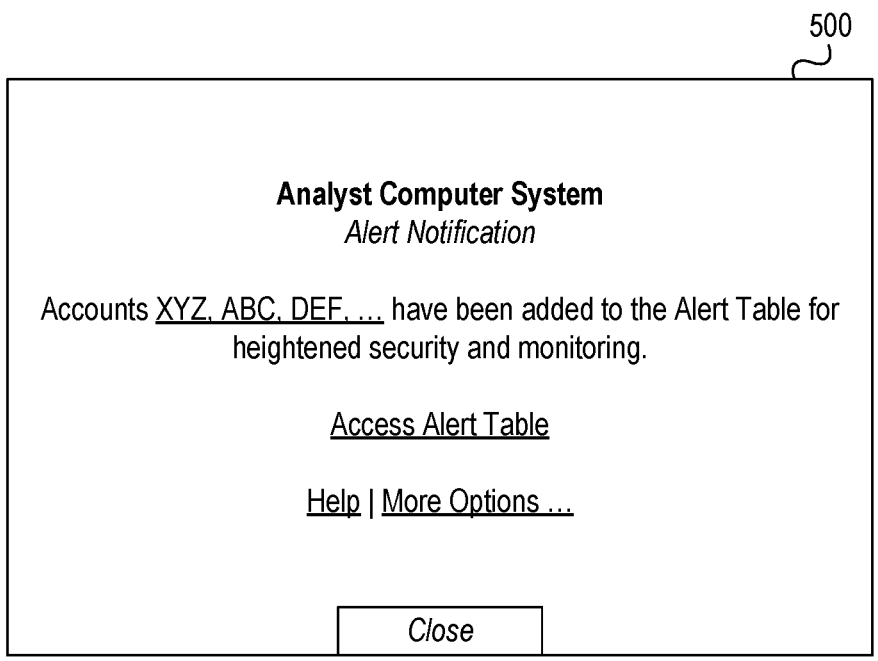

At step 319, dynamic record identification and analysis computing platform 110 may send one or more alert notifications to one or more of analyst computer system 170, remote user mobile computing device 180, and/or remote user computing device 185 (e.g., indicating that one or more specific accounts have been added to the alert table). For example, at step 319, dynamic record identification and analysis computing platform 110 may send, via the communication interface (e.g., communication interface 116), to one or more of an analyst computer system (e.g., analyst computer system 170) or a user computing device (e.g., remote user mobile computing device 180, remote user computing device 185), one or more alert notifications based on adding the second plurality of user accounts to the alert table. In some instances, in sending the one or more alert notifications to one or more of an analyst computer system (e.g., analyst computer system 170) or a user computing device (e.g., remote user mobile computing device 180, remote user computing device 185), dynamic record identification and analysis computing platform 110 may cause such devices to display and/or otherwise present a graphical user interface similar to graphical user interface 500, which is illustrated in FIG. 5. As seen in FIG. 5, graphical user interface 500 may include information indicating that one or more specific accounts have been added to the alert table, one or more user-selectable controls enabling a user to access the alert table, and/or one or more other user-selectable elements enabling the user to view additional information and/or access other commands and/or options.

At step 320, dynamic record identification and analysis computing platform 110 may update the merchant weighting information. For example, at step 320, dynamic record identification and analysis computing platform 110 may update merchant weighting information maintained by the computing platform (e.g., dynamic record identification and analysis computing platform 110) in a merchant database maintained by the computing platform (e.g., dynamic record identification and analysis computing platform 110) based on adding the second plurality of user accounts to the alert table. In addition, in updating the update merchant weighting information, dynamic record identification and analysis computing platform 110 may increase or decrease at least one weight applied to at least one specific merchant based on identifying the at least one specific merchant as the point of compromise. For instance, if a particular merchant has been identified as the point of compromise, then merchant weighting information may be updated to increase the likelihood that the same merchant or a similar merchant may be a point of compromise in connection with a different or future analysis of account reconnaissance activities involving user accounts.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive account reconnaissance data identifying a first plurality of user accounts that have experienced at least one event associated with account security concern characteristics;
   based on receiving the account reconnaissance data identifying the first plurality of user accounts that have experienced at least one event associated with account security concern characteristics, analyze event history data associated with the first plurality of user accounts to identify one or more common interactions associated with a subset of the first plurality of user accounts;
   based on analyzing the event history data associated with the first plurality of user accounts to identify the one or more common interactions associated with the subset of the first plurality of user accounts, identify a point of compromise among the subset of the first plurality of user accounts, the point of compromise corresponding to a particular common interaction of the one or more common interactions and wherein identifying the point of compromise among the subset of the first plurality of user accounts comprises identifying the point of compromise among the subset of the first plurality of user accounts based on transaction history information associated with the subset of the first plurality of user accounts;
   based on identifying the point of compromise among the subset of the first plurality of user accounts, generate a validation user interface for a user of an analyst computer system, the validation user interface comprising at least one user-selectable element of a plurality of user-selectable elements enabling the user of the analyst computer system to provide input validating the point of compromise identified by the computing platform;
   provide, via the communication interface, to the analyst computer system, the validation user interface generated for the user of the analyst computer system, wherein providing the validation user interface generated for the user of the analyst computer system to the analyst computer system causes the analyst computer system to display the validation user interface to the user of the analyst computer system; and
   receive, via the communication interface, from the analyst computer system, validation information indicating that the at least one user-selectable element of the plurality of user-selectable elements enabling the user of the analyst computer system to provide input validating the point of compromise identified by the computing platform has been selected by the user of the analyst computer system to validate the point of compromise identified by the computing platform;
   search enterprise user account records to identify a second plurality of user accounts that have at least one event associated with the point of compromise;
   based on searching the enterprise user account records to identify the second plurality of user accounts, add the second plurality of user accounts to an alert table;
   generate one or more system configuration commands based on adding the second plurality of user accounts to the alert table;
   send, via the communication interface, to an account management computer system, the one or more system configuration commands, wherein sending the one or more system configuration commands to the account management computer system causes the account management computer system to restrict transaction requests associated with the second plurality of user accounts processed by the account management computer system; and
   send, via the communication interface, to an interactive voice response computer system, the one or more system configuration commands, wherein sending the one or more system configuration commands to the interactive voice response computer system causes the interactive voice response computer system to restrict access requests associated with the second plurality of user accounts processed by the interactive voice response computer system.

2. The computing platform of claim 1, wherein identifying the point of compromise among the subset of the first plurality of user accounts comprises identifying the point of compromise among the subset of the first plurality of user accounts based on merchant weighting information determined and maintained by the computing platform.

3. The computing platform of claim 2, wherein identifying the point of compromise among the subset of the first plurality of user accounts comprises identifying the point of compromise among the subset of the first plurality of user accounts based on temporal grouping information determined and maintained by the computing platform.

4. The computing platform of claim 1, wherein the memory stores additional computer-readable instructions that, when executed by the at least one processor, cause the computing platform to:
prior to receiving the account reconnaissance data identifying the first plurality of user accounts that have experienced at least one event associated with account security concern characteristics:
receive, via the communication interface, from an account reconnaissance identification computer system, configuration information defining a data monitoring schedule for the computing platform; and
set one or more configuration preferences for the computing platform based on the configuration information defining the data monitoring schedule for the computing platform.

5. The computing platform of claim 4, wherein the memory stores additional computer-readable instructions that, when executed by the at least one processor, cause the computing platform to:
prior to receiving the account reconnaissance data identifying the first plurality of user accounts that have experienced at least one event associated with account security concern characteristics:
request, via the communication interface, from the account reconnaissance identification computer system, the account reconnaissance data identifying the first plurality of user accounts that have experienced at least one event associated with account security concern characteristics, based on the one or more configuration preferences.

6. The computing platform of claim 1, wherein the memory stores additional computer-readable instructions that, when executed by the at least one processor, cause the computing platform to:
after receiving the account reconnaissance data identifying the first plurality of user accounts that have experienced at least one event associated with account security concern characteristics:
send, via the communication interface, to an account management computer system, a request for account activity information associated with the first plurality of user accounts; and
receive, via the communication interface, from the account management computer system, the event history data associated with the first plurality of user accounts in response to the request for the account activity information associated with the first plurality of user accounts.

7. The computing platform of claim 6, wherein the memory stores additional computer-readable instructions that, when executed by the at least one processor, cause the computing platform to:
load, from a merchant database maintained by the computing platform, merchant weighting information determined by the computing platform based on previously identified connections between one or more specific merchants and one or more specific occurrences of account reconnaissance activity,
wherein identifying the point of compromise among the subset of the first plurality of user accounts comprises identifying the point of compromise among the subset of the first plurality of user accounts based on the merchant weighting information loaded from the merchant database maintained by the computing platform.

8. The computing platform of claim 1, wherein the memory stores additional computer-readable instructions that, when executed by the at least one processor, cause the computing platform to:
based on receiving the validation information from the analyst computer system, send, via the communication interface, to an account management computer system, a request for user account information; and
receive, via the communication interface, from the account management computer system, the enterprise user account records in response to the request for user account information.

9. The computing platform of claim 1, wherein the memory stores additional computer-readable instructions that, when executed by the at least one processor, cause the computing platform to:
send, via the communication interface, to a call center computer system, the one or more system configuration commands, wherein sending the one or more system configuration commands to the call center computer system causes the call center computer system to restrict access requests associated with the second plurality of user accounts processed by the call center computer system.

10. The computing platform of claim 1, wherein the memory stores additional computer-readable instructions that, when executed by the at least one processor, cause the computing platform to:
send, via the communication interface, to one or more of the analyst computer system or a user computing device, one or more alert notifications based on adding the second plurality of user accounts to the alert table.

11. A method, comprising:
at a computing platform comprising at least one processor, a communication interface, and memory:
receiving, by the at least one processor, account reconnaissance data identifying a first plurality of user accounts that have experienced at least one event associated with account security concern characteristics;
based on receiving the account reconnaissance data identifying the first plurality of user accounts that have experienced at least one event associated with account security concern characteristics, analyzing, by the at least one processor, event history data associated with the first plurality of user accounts to identify one or more common interactions associated with a subset of the first plurality of user accounts;
based on analyzing the event history data associated with the first plurality of user accounts to identify the one or more common interactions associated with the subset of the first plurality of user accounts, identifying, by the at least one processor, a point of compromise among the subset of the first plurality of user accounts, the point of compromise corresponding to a particular common interaction of the one or more common interactions and wherein identifying the point of compromise among the subset of the first plurality of user accounts comprises identifying the point of compromise among the subset of the first plurality of user accounts based on transaction history information associated with the subset of the first plurality of user accounts;
based on identifying the point of compromise among the subset of the first plurality of user accounts, generating, by the at least one processor, a validation user interface for a user of an analyst computer system, the validation user interface comprising at least one user-selectable element of a plurality of user-selectable elements enabling the user of the analyst computer system to provide input validating the point of compromise identified by the computing platform;

providing, by the at least one processor and via the communication interface, to the analyst computer system, the validation user interface generated for the user of the analyst computer system, wherein providing the validation user interface generated for the user of the analyst computer system to the analyst computer system causes the analyst computer system to display the validation user interface to the user of the analyst computer system;

receiving, by the at least one processor and via the communication interface, from the analyst computer system, validation information indicating that the at least one user-selectable element of the plurality of user-selectable elements enabling the user of the analyst computer system to provide input validating the point of compromise identified by the computing platform has been selected by the user of the analyst computer system to validate the point of compromise identified by the computing platform;

searching, by the at least one processor, enterprise user account records to identify a second plurality of user accounts that have at least one event associated with the point of compromise; and based on searching the enterprise user account records to identify the second plurality of user accounts, adding, by the at least one processor, the second plurality of user accounts to an alert table;

generating, by the at least one processor, one or more system configuration commands based on adding the second plurality of user accounts to the alert table;

sending, by the at least one processor and via the communication interface, to an account management computer system, the one or more system configuration commands, wherein sending the one or more system configuration commands to the account management computer system causes the account management computer system to restrict transaction requests associated with the second plurality of user accounts processed by the account management computer system; and sending, by the at least one processor and via the communication interface, to an interactive voice response computer system, the one or more system configuration commands, wherein sending the one or more system configuration commands to the interactive voice response computer system causes the interactive voice response computer system to restrict access requests associated with the second plurality of user accounts processed by the interactive voice response computer system.

12. The method of claim 11, wherein identifying the point of compromise among the subset of the first plurality of user accounts comprises identifying the point of compromise among the subset of the first plurality of user accounts based on merchant weighting information determined and maintained by the computing platform.

13. The method of claim 12, wherein identifying the point of compromise among the subset of the first plurality of user accounts comprises identifying the point of compromise among the subset of the first plurality of user accounts based on temporal grouping information determined and maintained by the computing platform.

14. The method of claim 11, comprising:
prior to receiving the account reconnaissance data identifying the first plurality of user accounts that have experienced at least one event associated with account security concern characteristics:
receiving, by the at least one processor, via the communication interface, from an account reconnaissance identification computer system, configuration information defining a data monitoring schedule for the computing platform; and
setting, by the at least one processor, one or more configuration preferences for the computing platform based on the configuration information defining the data monitoring schedule for the computing platform.

15. One or more non-transitory computer-readable media storing instructions that, when executed by a computing platform comprising at least one processor, a communication interface, and memory, cause the computing platform to:
receive account reconnaissance data identifying a first plurality of user accounts that have experienced at least one event associated with account security concern characteristics;
based on receiving the account reconnaissance data identifying the first plurality of user accounts that have experienced at least one event associated with account security concern characteristics, analyze event history data associated with the first plurality of user accounts to identify one or more common interactions associated with a subset of the first plurality of user accounts;
based on analyzing the event history data associated with the first plurality of user accounts to identify the one or more common interactions associated with the subset of the first plurality of user accounts, identify a point of compromise among the subset of the first plurality of user accounts, the point of compromise corresponding to a particular common interaction of the one or more common interactions and wherein identifying the point of compromise among the subset of the first plurality of user accounts comprises identifying the point of compromise among the subset of the first plurality of user accounts based on transaction history information associated with the subset of the first plurality of user accounts;
based on identifying the point of compromise among the subset of the first plurality of user accounts, generate a validation user interface for a user of an analyst computer system, the validation user interface comprising at least one user-selectable element of a plurality of user-selectable elements enabling the user of the analyst computer system to provide input validating the point of compromise identified by the computing platform;
provide, via the communication interface, to the analyst computer system, the validation user interface generated for the user of the analyst computer system, wherein providing the validation user interface generated for the user of the analyst computer system to the analyst computer system causes the analyst computer system to display the validation user interface to the user of the analyst computer system; and
receive, via the communication interface, from the analyst computer system, validation information indicating that the at least one user-selectable element of the plurality of user-selectable elements enabling the user of the analyst computer system to provide input validating the point of compromise identified by the computing platform has been selected by the user of the analyst computer system to validate the point of compromise identified by the computing platform;

search enterprise user account records to identify a second plurality of user accounts that have at least one event associated with the point of compromise;

based on searching the enterprise user account records to identify the second plurality of user accounts, add the second plurality of user accounts to an alert table;

generate one or more system configuration commands based on adding the second plurality of user accounts to the alert table;

send, via the communication interface, to an account management computer system, the one or more system configuration commands, wherein sending the one or more system configuration commands to the account management computer system causes the account management computer system to restrict transaction requests associated with the second plurality of user accounts processed by the account management computer system; and send, via the communication interface, to an interactive voice response computer system, the one or more system configuration commands, wherein sending the one or more system configuration commands to the interactive voice response computer system causes the interactive voice response computer system to restrict access requests associated with the second plurality of user accounts processed by the interactive voice response computer system.

* * * * *